(12) United States Patent
Tatsuda

(10) Patent No.: US 11,148,413 B2
(45) Date of Patent: Oct. 19, 2021

(54) PRINTER AND GENERATION METHOD OF CORRECTION VALUE

(71) Applicant: SEIKO EPSON CORPORATION, Tokyo (JP)

(72) Inventor: Tetsuo Tatsuda, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/884,879

(22) Filed: May 27, 2020

(65) Prior Publication Data

US 2020/0376831 A1    Dec. 3, 2020

(30) Foreign Application Priority Data

May 28, 2019  (JP) .............................. JP2019-099123

(51) Int. Cl.
*B41J 2/045*    (2006.01)
*B41J 2/125*    (2006.01)

(52) U.S. Cl.
CPC .......... *B41J 2/04505* (2013.01); *B41J 2/125* (2013.01)

(58) Field of Classification Search
CPC ...... B41J 2/04501; B41J 29/38; B41J 29/387; B41J 29/393; B41J 2/04505; B41J 2/125; B41J 2/2135; G06K 15/027

See application file for complete search history.

(56) References Cited

U.S. PATENT DOCUMENTS

| | | | |
|---|---|---|---|
| 7,324,142 B2 * | 1/2008 | Silverbrook | B41J 2/17503 348/207.2 |
| 2011/0096132 A1 * | 4/2011 | Kobayashi | B41J 11/00214 347/102 |
| 2018/0332189 A1 | 11/2018 | Tatsuda | |
| 2020/0230951 A1 * | 7/2020 | Kobayashi | B41J 25/3082 |

FOREIGN PATENT DOCUMENTS

JP    2018-187873    11/2018

* cited by examiner

*Primary Examiner* — Kristal Feggins
(74) *Attorney, Agent, or Firm* — Workman Nydegger

(57) ABSTRACT

A printer includes: a carriage which moves with a print head mounted thereon, the print head being configured to eject ink; a camera attached to the carriage and configured to capture an image printed on a print medium by the print head; a movement mechanism configured to move the carriage along a main scan direction; a transportation mechanism configured to transport the print medium along a sub-scan direction; a processor configured to control printing of the image onto the print medium; and a storage configured to store a correction value of a movement amount of the movement mechanism as a first correction value for a location adjustment of a capture area of the camera and store a correction value of a transportation amount of the transportation mechanism as a second correction value for the location adjustment of the capture area.

9 Claims, 11 Drawing Sheets

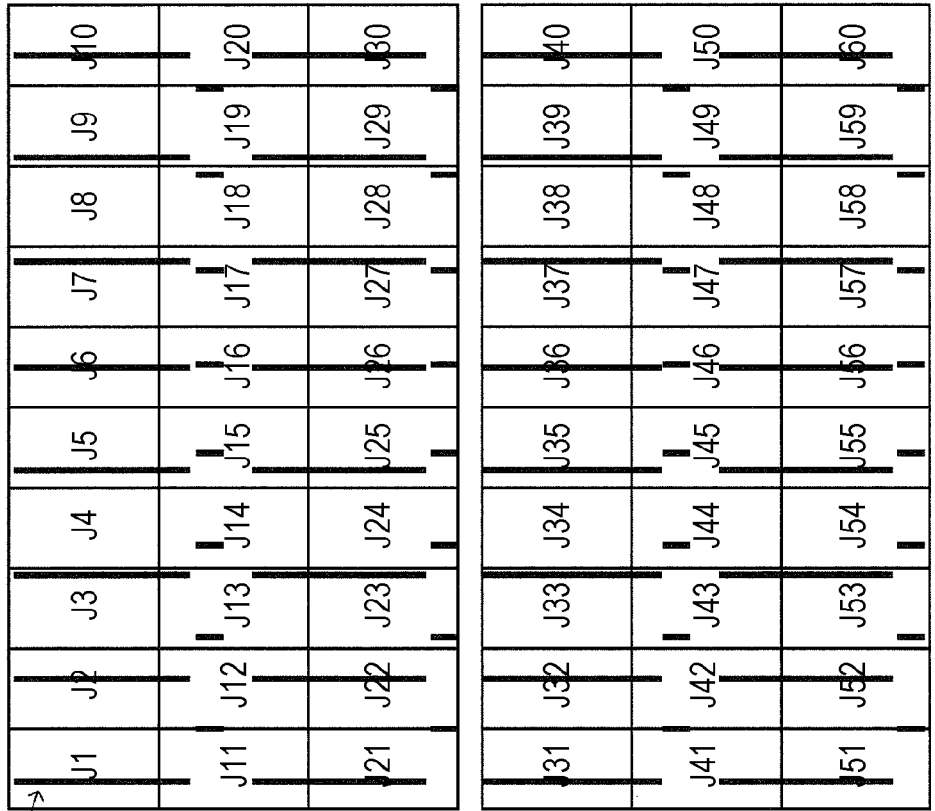
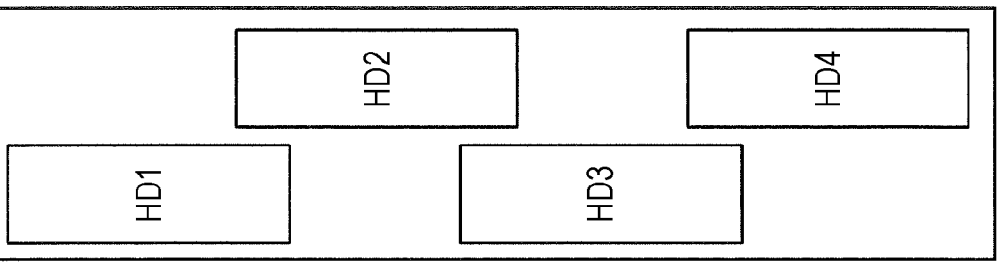
FIG 13

PRINTER AND GENERATION METHOD OF CORRECTION VALUE

The present application is based on, and claims priority from JP Application Serial Number 2019-099123, filed May 28, 2019, the disclosure of which is hereby incorporated by reference herein in its entirety.

BACKGROUND

1. Technical Field

The present disclosure relates to a printer and a generation method of a correction value, or the like.

2. Related Art

JP-A-2018-187873 discloses a printer configured to improve attachment accuracy of a camera that captures a test pattern. The printer of JP-A-2018-187873 is provided with an adjustment mechanism configured to adjust an attachment location of the camera. Then, a carriage is moved to a location of a prescribed mark provided in advance, an image of the prescribed mark is captured by the camera, and the attachment location of the camera is adjusted by using the adjustment mechanism based on the image of the prescribed mark thus captured. Specifically, an adjustment mechanism provided on the carriage to adjust a mechanical installation location is prepared as the adjustment mechanism configured to adjust the attachment location of the camera, and the adjustment mechanism is adjusted, thereby adjusting an optimal attachment location of the camera. This improves the accuracy of the attachment location of the camera, and the image captured by the camera has high precision, and therefore, it is possible to increase the accuracy of a print adjustment.

In order to mechanically adjust the installation location of the camera, however, the carriage has to be provided with a complex adjustment mechanism. Moreover, when the installation location of the camera is manually adjusted, it is not easy to perform a fine adjustment to an optimal location.

SUMMARY

One aspect of the present disclosure relates to a printer including: a carriage configured to move with a print head mounted thereon, the print head being configured to eject ink; a camera attached to the carriage and configured to capture an image printed by the print head; a movement mechanism configured to move the carriage along a main scan direction; a transportation mechanism configured to transport a print medium along a sub-scan direction; a processor configured to control printing of the image onto the print medium; and a storage configured to store a correction value of a movement amount of the movement mechanism as a first correction value for a location adjustment of a capture area of the camera and store a correction value of a transportation amount of the transportation mechanism as a second correction value for the location adjustment of the capture area.

BRIEF DESCRIPTION OF THE DRAWINGS

FIG. 13 is a view illustrating capturing the print adjusting pattern when a location adjustment of a capture area is not performed.

DESCRIPTION OF EXEMPLARY EMBODIMENTS

Embodiments of the present embodiment will be described below. Note that the present embodiment described below is not to unreasonably limit the contents in the claims. Moreover, all components described in the present embodiment are not necessarily essential components.

1. Printer

Figure 1:
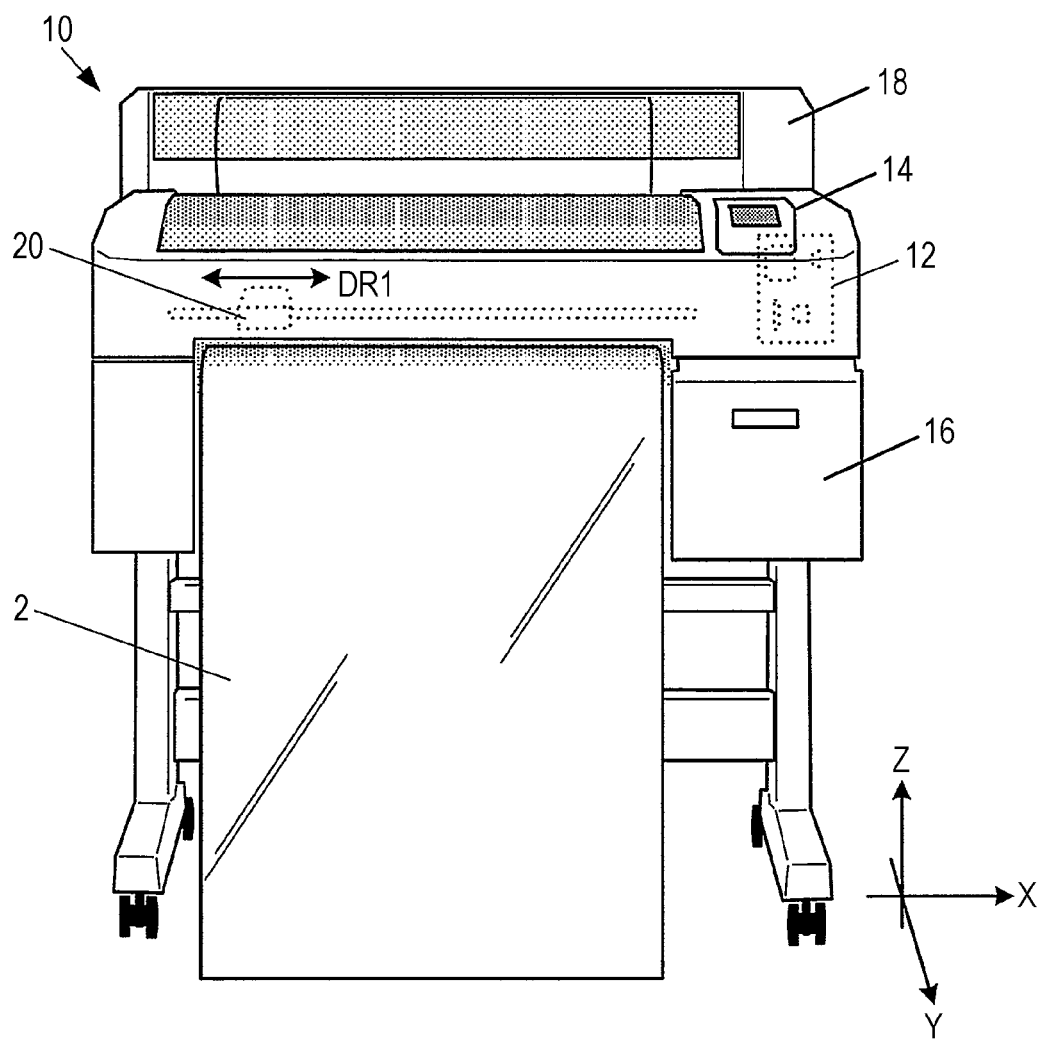
FIG. 1 is a front view illustrating a printer.

FIG. 1 is a front view illustrating a printer 10 of the present embodiment. The printer 10 is an ink jet-type printer configured to eject droplets of ink such as dye or pigment onto a print medium 2 to form an image on the print medium 2 based on image data which is print data. Specifically, based on image data of colors such as RGB, a color image is printed on the print medium 2. The image data is supplied to the printer 10 from an external host device. The print medium 2 is a sheet-like medium, and types of the print medium 2 include a paper type and a film type. Examples of the paper type include cast-coated paper, art paper, or coated paper. Examples of the film type include synthetic paper, polyethylene terephthalate (PET), and poly-propylene (PP). Note that the print medium 2 may be, for example, fiber.

The printer 10 includes a control substrate 12, a manipulation panel 14, an ink housing 16, a feeder 18, and a carriage 20. The control substrate 12 is a substrate which comprehensively controls operation of the printer 10 and on which a processor, a memory storing various types of information, and the like are mounted. The manipulation panel 14 is a panel via which a user gives a setting operation and/or an input operation to the printer 10. The ink housing 16 is provided with a plurality of accommodation units, and in each of the accommodation units, a corresponding one of inks of a plurality of colors including black, yellow, magenta, cyan, and the like are stored. In the feeder 18, the print medium 2 cylindrically wound as a roll body is loaded. While the printer 10 is controlled by the control substrate 12 to move the carriage 20 along a main scan direction DR1, the printer 10 ejects ink in the form of liquid onto the print medium 2, thereby performing printing. In the present embodiment, a description is given mainly of an example in which the printer 10 is a large format printer (LFP) which performs serial printing on a print medium 2 having an A2 size or larger. However, the printer 10 may be a medium or small ink jet-type printer.

Note that in FIG. 1, the X-axis direction, which is a direction along the X axis, is a direction along the main scan direction DR1 and is a lateral direction of the printer 10 in FIG. 1. The Y-axis direction, which is a direction along the Y-axis, is a transportation direction of the print medium 2, is a front/rear direction of the printer 10, and corresponds to a sub-scan direction DR2 in FIG. 3 which will be described later. The Z-axis direction, which is a direction along the Z axis, is a vertical direction as the gravity direction and is a direction orthogonal to the X axis and the Y axis.

Figure 2:
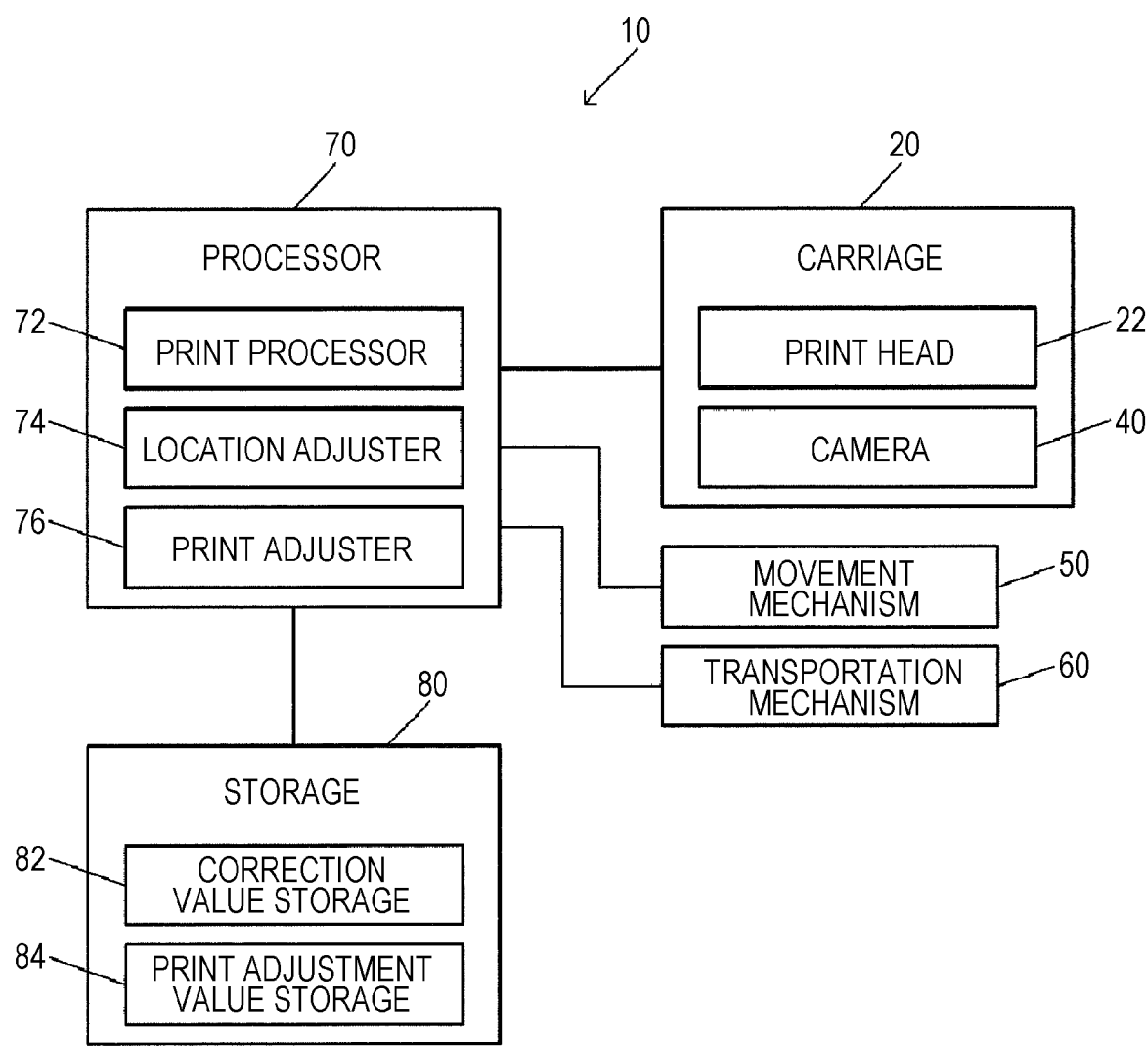
FIG. 2 is a view illustrating a configuration example of the printer.
Figure 3:
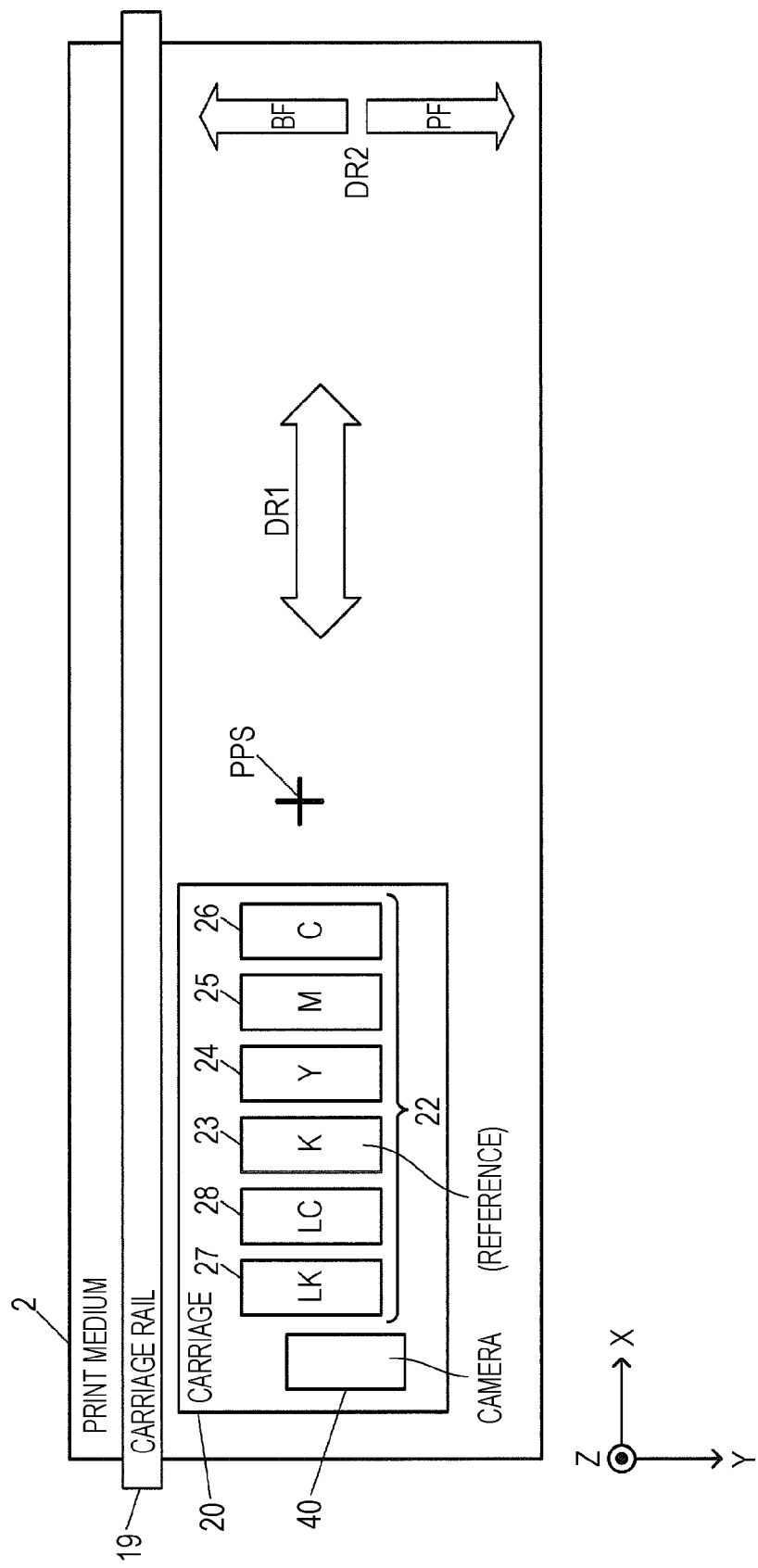
FIG. 3 is a plan view schematically illustrating an arrangement of a carriage, a camera, and a location adjusting pattern.

FIG. 2 is a block diagram illustrating a configuration example of the printer 10, FIG. 3 is a plan view schematically illustrating an arrangement of the carriage 20, a camera 40, and a location adjusting pattern PPS. The printer 10 includes the carriage 20, the camera 40, a movement mechanism 50, a transportation mechanism 60, a processor 70, and a storage 80. Note that a modified embodiment in which some of these components are omitted may be possible.

The carriage 20 moves with a print head 22 mounted thereon. The print head 22 is configured to eject ink. That is, the carriage 20 is accommodated in a body of the printer 10 in a state where the carriage 20 is reciprocally movable along the main scan direction DR1 in FIG. 3. The carriage 20 moves along the main scan direction DR1 with the print head 22 mounted thereon. As described above, the print head 22 mounted on the carriage 20 configured to move along the main scan direction DR1 ejects ink, thereby performing printing onto the print medium 2.

Figure 14:
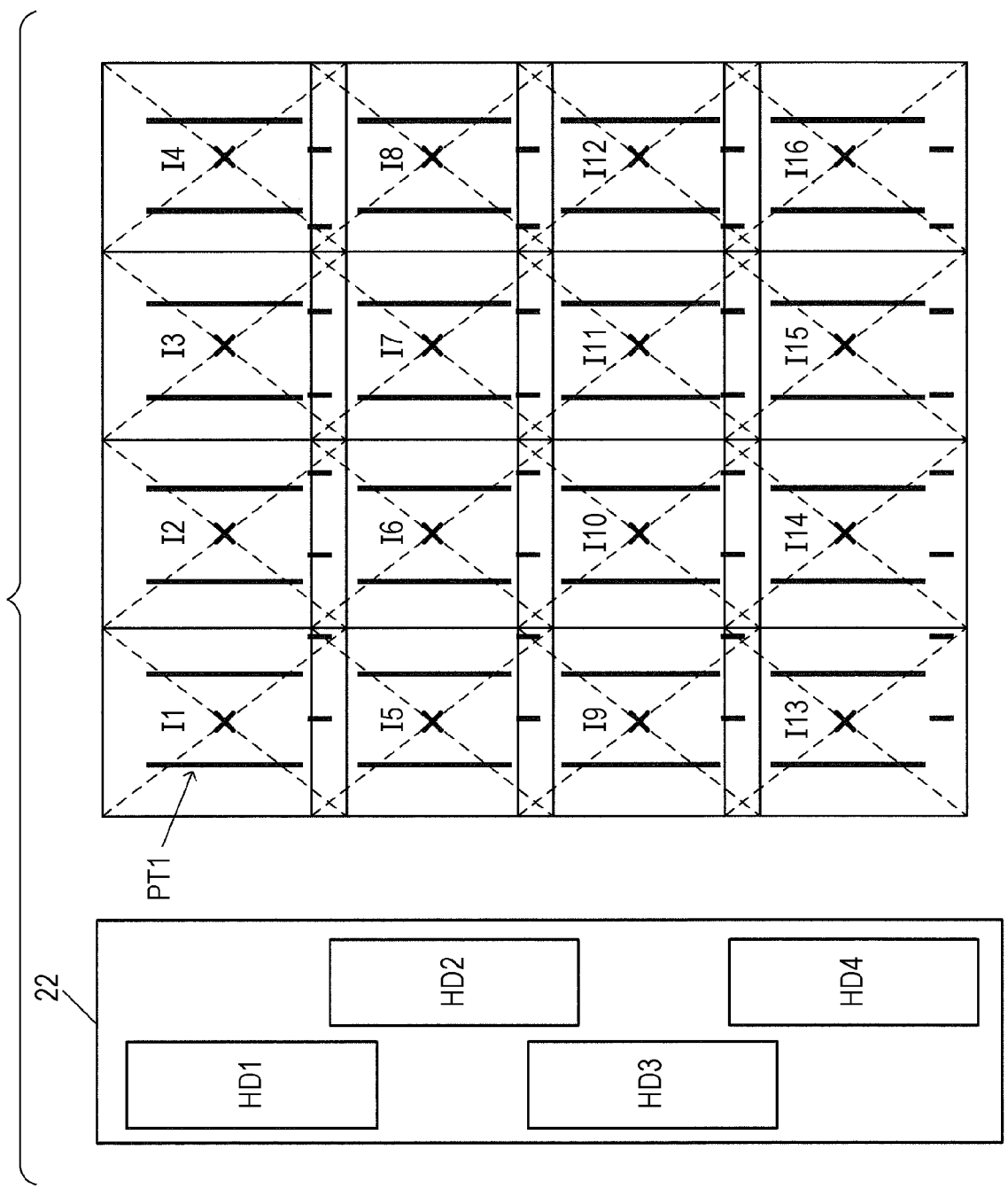
FIG. 14 is a view illustrating capturing the print adjusting pattern when the location adjustment of the capture area is performed.

As illustrated in FIG. 3, the print head 22 includes a plurality of head chips 23, 24, 25, 26, 27, and 28, and ink of each color is ejected from a corresponding one of the head chips. Specifically, the head chips 23, 24, 25, 26, 27, and 28 are respectively supplied with inks of colors of black (K), yellow (Y), magenta (M), cyan (C), light black (LK), and light cyan (LC) from the accommodation units of the ink housing 16 of FIG. 1 via a tube which is not shown, and the head chips 23, 24, 25, 26, 27, and 28 eject ink droplets of inks of the respective colors. Each of the head chips 23, 24, 25, 26, 27, and 28 has an ejection surface at which a plurality of nozzles configured to eject ink droplets are arranged and which is open. Ink of a corresponding one of the colors is ejected from the plurality of nozzles on the ejection surface. This enables a color image to be printed onto the print medium 2. While FIG. 3 schematically illustrates the arrangement of the head chips 23, 24, 25, 26, 27, and 28 included in a head unit, various arrangements of the head chips are possible as illustrated in FIG. 14 which will be described later. Moreover, in the present embodiment, the head chip 23 which ejects black ink is a reference head chip of the print head 22.

The camera 40 is a device configured to be attached to the carriage 20 and capture an image printed by the print head 22. The camera 40 includes: an optical system such as a lens unit; and an image sensor such as a CMOS sensor or a CCD. Moreover, the camera 40 is further provided with a light source such as an LED light source.

The movement mechanism 50 is a mechanism configured to move the carriage 20 along the main scan direction DR1. The movement mechanism 50 serving as a movement device includes: a movement restriction member, such as a carriage rail 19, configured to restrict movement of the carriage 20; and a carriage moving driver having a CR motor for carriage movement and a motor driver configured to drive the CR motor. The movement mechanism 50 moves the carriage 20 along the carriage rail 19 by the carriage moving driver. Thus, the carriage 20 moves along the main scan direction DR1.

The transportation mechanism 60 is a mechanism configured to transport the print medium 2 along the sub-scan direction DR2 of FIG. 3. The transportation mechanism 60 serving as a transportation apparatus includes: a transportation member such as a transportation roller configured to transport the print medium 2; a transportation motor configured to rotate the transportation roller; and a transportation driver including a motor driver configured to drive the transportation motor. The transportation mechanism 60 rotates the transportation roller by using the transportation driver to transport the print medium 2 wound as a roll body in the feeder 18 in the sub-scan direction DR2. In FIG. 3, a forward direction of transportation of the print medium 2 is referred to as a feed direction PF, and a backward direction of the transportation is referred to as a back feed direction BF. The feed direction PF is a direction directed downstream in the transportation direction serving as the sub-scan direction DR2. The back feed direction BF is a direction directed upstream in the transportation direction. The feed direction PF is a direction toward the positive side of the Y axis. The back feed direction BF is a direction toward the negative side of the Y-axis. The transportation mechanism 60 transports the print medium 2 from upstream to downstream in the transportation direction which is the sub-scan direction DR2.

The processor 70 is configured to control printing of an image on the print medium 2. For example, the processor 70 controls ejection of ink from the print head 22. The processor 70 controls movement of the carriage 20 by the movement mechanism 50 and also controls transportation of the print medium 2 by the transportation mechanism 60. In this way, print control is realized. The print control is performed by a print processor 72. The processor 70 also controls the entirety of the printer 10 and controls capturing of an image by the camera 40, for example. The processor 70 controls a location adjustment of a capture area of the camera 40, which will be described later, and controls a print adjustment. The control of the location adjustment is performed by a location adjuster 74. The control of the print adjustment is performed by a print adjuster 76. The processor 70 serving as a controller is realizable, for example, by a processor mounted on the control substrate 12 of FIG. 1. The processor is realizable by, for example, a central processing unit (CPU), a digital signal processor (DSP), or a control IC. The control IC is an integrated circuit device called an application specific integrated circuit (ASIC) and is realizable by wires automatically arranged by a gate array or the like.

The storage 80 stores various types of information. The storage 80 stores information for executing various types of control and processes of the printer 10. In the present embodiment, the storage 80 stores, as a first correction value for location adjustment of the capture area of the camera 40, a correction value of a movement amount of the movement mechanism 50. Moreover, the storage 80 stores, as a second correction value for the location adjustment of the capture area, a correction value of a transportation amount of the transportation mechanism 60. The movement amount of the movement mechanism 50 is controlled based on the first correction value, and the transportation amount of the transportation mechanism 60 is controlled based on the second correction value, thereby realizing the location adjustment of the capture area of the camera 40. The first correction value and the second correction value for the location adjustment of the capture area of the camera 40 are stored in a correction value storage 82. Moreover, in the present embodiment, the print adjustment is performed based on the captured image by the camera 40, and a print adjustment value of the print adjustment is stored in a print adjustment value storage 84. The storage 80 is realizable by a memory mounted on the control substrate 12 of FIG. 1. The memory is, for example, a semiconductor memory and is, specifically, a nonvolatile memory. The nonvolatile memory is realizable by, for example, one time programmable (OTP) including an electrically erasable programmable read-only memory (EEPROM), a floating gate avalanche injection MOS (FAMOS), or the like.

Figure 6:
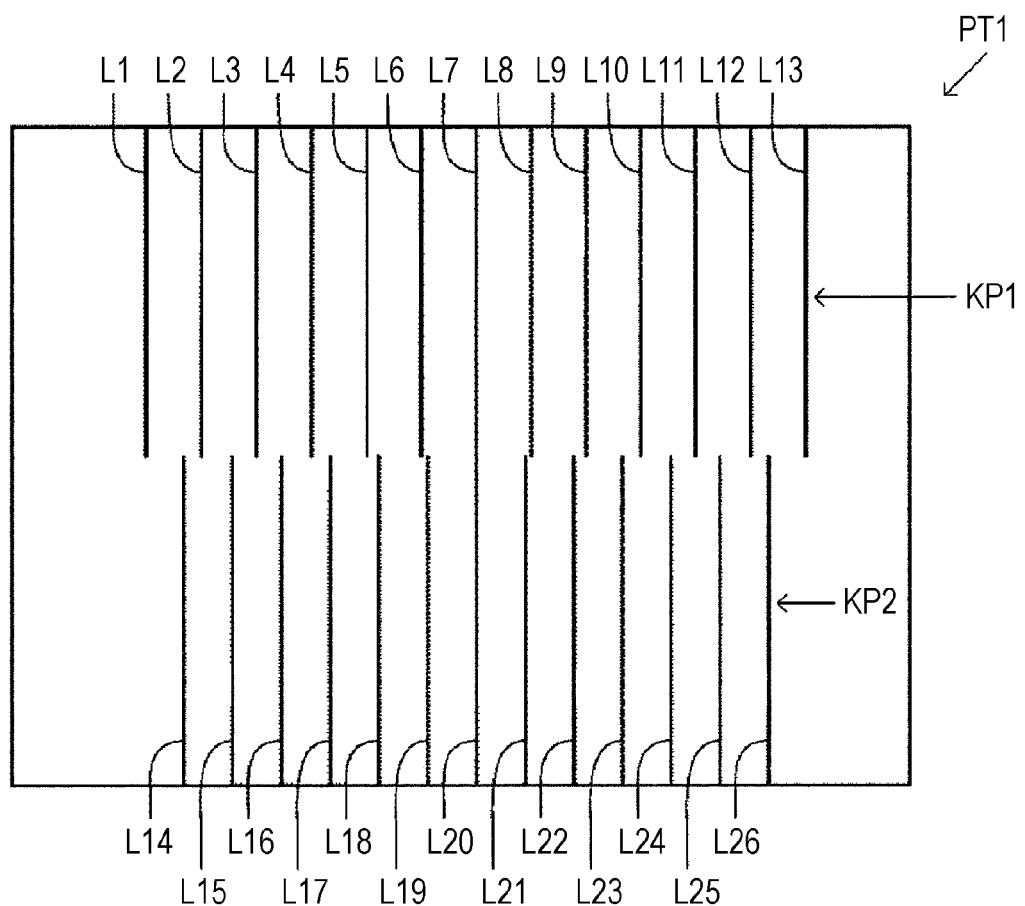
FIG. 6 is a view illustrating an example of a print adjusting pattern used to adjust an ejection timing.

As stated above, in the present embodiment, the camera 40 is provided to the carriage 20, and the carriage 20 moves along the main scan direction DR1, and thereby, the camera 40 also moves along the main scan direction DR1. In the present embodiment, print adjusting patterns PT1 to PT3 which will be described later in FIGS. 6 and 8 are captured by the camera 40, and based on captured images thus obtained, print adjustments, such as an ejection timing, an ejection amount, and uneven print of ink, are performed. In this case, when an error occurs in the attachment location of the camera 40, and the error in the attachment location is not corrected, an effective capture range ARE of the camera 40 is reduced as illustrated in FIGS. 9 to 14 which will be described later. When the effective capture range ARE is reduced as described above, the number of images which is to be captured and which is required to capture the print adjusting patterns PT1 to PT3 of FIGS. 6 to 8 increases, thereby causing problems for example, an increase in capturing time and/or adjustment time, an increase in a process load of an image process, and an increase in process time.

In this case, the installation location of the camera may be mechanically adjusted as in the case of JP-A-2018-187873 to correct the error in the attachment location of the camera. However, in the method described in JP-A-2018-187873, a complicated adjustment mechanism has to be prepared in the carriage. Moreover, when the installation location of the camera is manually adjusted, it is not easy to perform a fine adjustment to an optimal location. Alternatively, when the installation location of the camera is automatically adjusted, a processor that controls the adjustment mechanism is also required, and therefore, further complicated mechanical components and/or control circuits is required. Thus, cost increases, and an increase in size of the carriage also leads to an increase in weight, thereby requiring extensive improvement of peripheral circuits and a mechanical mechanism for control and stable movement of the carriage.

Thus, in the present embodiment, the camera 40 configured to capture an image printed by the print head 22 is attached to the carriage 20 in the printer 10 including the carriage 20, the movement mechanism 50 configured to move the carriage 20 along the main scan direction DR1, the transportation mechanism 60 configured to transport the print medium 2 along the sub-scan direction DR2, the processor 70 configured to perform the print control, and the storage 80. Then, as the first correction value for the location adjustment of the capture area of the camera 40, the correction value of the movement amount of the movement mechanism 50 is stored in the storage 80, and as the second correction value for the location adjustment of the capture area, the correction value of the transportation amount of the transportation mechanism 60 is stored in the storage 80. For example, as illustrated in FIG. 4 described later, correction values $\Delta x$ and $\Delta y$ respectively as the first correction value and the second correction value for the location adjustment of the capture area AR of the camera 40 are stored in the storage 80.

Figure 4:
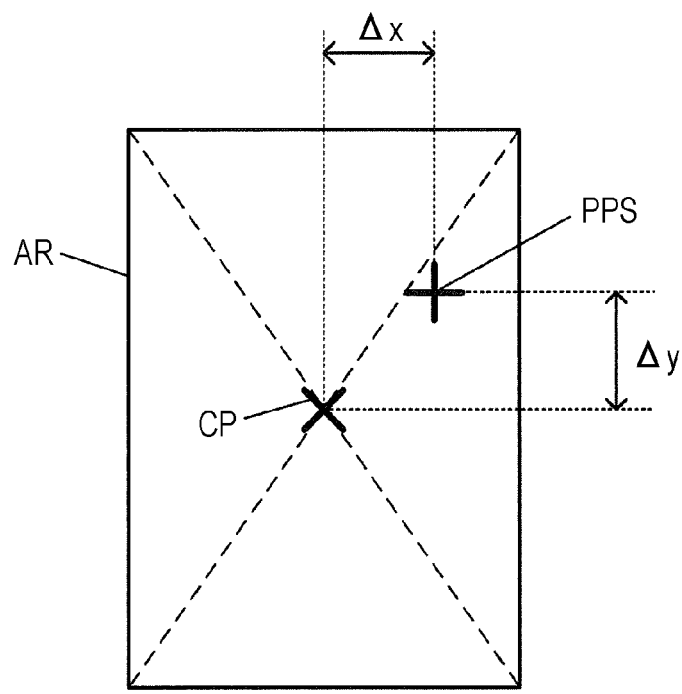
FIG. 4 is a view illustrating a computation method of a correction value based on the location adjusting pattern.

Thus, the correction value $\Delta x$ serving as the first correction value for correcting the movement amount of the movement mechanism 50 and the correction value $\Delta y$ serving as the second correction value for correcting the transportation amount of the transportation mechanism 60 are stored in the storage 80, which enables the location of the capture area AR of the camera 40 of FIG. 4 to be adjusted. Thus, also when an error occurs in the attachment location of the camera 40, using the correction values $\Delta x$ and $\Delta y$ enables a reference location CP of the capture area AR of the camera 40 to be adjusted. For example, it is possible to adjust such that the reference location CP such as a center location of capturing an image by the camera 40 is in an appropriate location. Thus, also when the error occurs in the attachment location of the camera 40, capturing an image by the camera 40 at an optimal angle of view becomes possible, and an appropriate print adjustment based on the captured image by camera 40 becomes possible. Note that the error in the attachment location of the camera 40 occurs due to, for example, an attachment error of the camera 40 to the carriage 20 and/or an attachment error of the carriage 20 to the body of the printer 10.

When performing the print adjustment based on the captured image by the camera 40, the processor 70 controls the movement amount of the movement mechanism 50 based on the correction value $\Delta x$ serving as the first correction value and controls the transportation amount of the transportation mechanism 60 based on the correction value $\Delta y$ serving as the second correction value. For example, the movement mechanism 50 moves the carriage 20 based on the correction value $\Delta x$, and the transportation mechanism 60 transports the print medium 2 based on the correction value $\Delta y$, and thereafter, the camera 40 captures an image of the print adjusting pattern. Then, the processor 70 performs the print adjustment based on the captured image thus obtained. In this way, also when the error occurs in the attachment location of the camera 40, the error is compensated based on the correction values $\Delta x$ and $\Delta y$, and the print adjustment based on the print adjusting patterns PT1 to PT3 of FIGS. 6 to 8 becomes possible. Therefore, the print adjustment based on the captured image captured at an optimal angle of view becomes possible, and therefore, it becomes possible to shorten the adjustment time of the print adjustment and reduce the process load of the adjustment process.

Specifically, the processor 70 controls printing of the print adjusting pattern onto the print medium 2. In order to print the print adjusting pattern onto the print medium 2, the processor 70, for example, controls movement of the carriage 20 by the movement mechanism 50, controls transportation of the print medium 2 by the transportation mechanism 60, and controls ejection of ink from the print head 22. Thus, an image of the print adjusting pattern which is a print adjustment chart is printed onto the print medium 2. After the print adjusting pattern is printed, the processor 70 controls the movement amount based on the correction value $\Delta x$ serving as the first correction value and controls the transportation amount based on the correction value $\Delta y$ serving as the second correction value, thereby performing the location adjustment of the capture area AR of the camera 40. For example, the location adjustment based on the correction values Δx and Δy is performed such that the reference location CP of the capture area AR of the camera 40 is in an appropriate location. After the location adjustment of the capture area AR, the camera 40 captures the print adjusting pattern. In this way, also when an error occurs in the attachment location of the camera 40, it becomes possible to capture the print adjusting pattern at an appropriate angle of view, and therefore, it becomes possible to shorten the adjustment time of the print adjustment and reduce the process load of the adjustment process.

For example, the processor 70 controls printing of the location adjusting pattern PPS of the capture area AR of the camera 40 onto the print medium 2. In FIG. 3, a cross mark is printed as the location adjusting pattern PPS on the print medium 2. In order to print the location adjusting pattern PPS onto the print medium 2, the processor 70 controls movement of the carriage 20 by the movement mechanism 50, controls transportation of the print medium 2 by the transportation mechanism 60, and controls ejection of ink from the print head 22. Thus, the location adjusting pattern PPS is printed at a prescribed position on the print medium 2. Note that the location adjusting pattern PPS is not limited to such a cross mark, but marks having various types of shapes may be adopted as long as they are patterns available for the location adjustment. After the location adjusting pattern PPS is printed, the processor 70 moves the carriage 20 to the location of the location adjusting pattern PPS. For example, in FIG. 3, the carriage 20 is moved in the right direction such that the location adjusting pattern PPS is within the angle of view of the camera 40. Then, the camera 40 images the location adjusting pattern PPS, and the processor 70 obtains the correction values Δx and Δy based on the captured image of the location adjusting pattern PPS captured by the camera 40 and stores the correction values Δx and Δy in the storage 80. In this way, it is possible to analyze a shift amount of the location of the location adjusting pattern PPS in the captured image by the camera 40 to obtain the correction values Δx and Δy and store the correction values Δx and Δy in the storage 80. Then, when the print adjustment based on the captured image by the camera 40 is performed, the movement amount of the movement mechanism 50 and the transportation amount of the transportation mechanism 60 are controlled based on the correction values Δx and Δy stored in the storage 80, and thereby, it is possible to realize the print adjustment based on the captured image captured at the optimal angle of view. Note that computing and storing of the correction values Δx and Δy are performed after the camera 40 is attached to the carriage 20 when the printer 10 is assembled. Alternatively, when the print head 22 and the like are replaced, computation of the correction values Δx and Δy may be performed again, and the correction values Δx and Δy may be stored in the storage 80.

FIG. 4 shows an example of a captured image of the location adjusting pattern PPS captured by the camera 40. The reference location CP of the capture area AR is, for example, the center location of capturing by the camera 40. The processor 70 obtains, as the correction value Δx, a shift amount of the location of the location adjusting pattern PPS in the main scan direction DR1 with respect to the reference location CP of the capture area AR. For example, a shift amount in a positive-side direction or a negative-side direction of the X axis is obtained as the correction value Δx. Moreover, the processor 70 obtains, as the correction value Δy, a shift amount of the location of the location adjusting pattern PPS in the sub-scan direction DR2 with respect to the reference location CP. For example, a shift amount in a positive-side direction or a negative-side direction of the Y axis is obtained as the correction value Δy. When the print adjustment is performed based on the print adjusting pattern, the movement amount of the movement mechanism 50 and the transportation amount of the transportation mechanism 60 are controlled based on the correction values Δx and Δy such that the location of the location adjusting pattern PPS coincide with the reference location CP. In this way, it is possible to realize the print adjustment based on the captured image captured at the optimal angle of view, and it becomes possible to shorten the adjustment time of the print adjustment and reduce the process load of the adjustment process.

Note that the processor 70 causes a reference head chip included in the plurality of head chips 26 to 28 included in the print head 22 to eject ink, thereby controlling printing of the location adjusting pattern PPS onto the print medium 2. In FIG. 3, the head chip 23 which ejects black ink is the reference head chip. In this way, the location adjusting pattern PPS, which is to be printed in black ink, is printed onto the print medium 2, and based on the location adjusting pattern PPS, the correction values Δx and Δy are to be computed. Note that the reference head chip may be a head chip which ejects a color other than black.

Moreover, as illustrated in FIG. 3, the camera 40 is disposed at a location shifted downstream from the print head 22 in the transportation direction of the transportation mechanism 60. That is, the camera 40 is disposed at a location shifted downstream from the location of the print head 22 in the transportation direction serving as the sub-scan direction DR2. For example, the camera 40 is disposed at a location shifted downstream from the location of the head chip 23 used for printing of the location adjusting pattern PPS in the transportation direction. Downstream in the transportation direction refers to a side in the feed direction PF of the print medium 2 of FIG. 3 and is the positive-direction side of the Y-axis. In this way, also when no error occurs in the attachment location of the camera 40, the location of the location adjusting pattern PPS in the captured image by the camera 40 is shifted to an upstream location in the transportation direction. That is, the location of the location adjusting pattern PPS is shifted to a location on a negative-direction side of the Y-axis. The transportation mechanism 60 transports the print medium 2 in the feed direction PF, namely, downstream, in the transportation direction, and thereby, the location adjustment of the capture area AR of the camera 40 becomes possible, and it is possible to realize an appropriate location adjustment.

Moreover, in the transportation mechanism 60, the transportation accuracy of the print medium 2 directed downstream in the transportation direction is higher than the transportation accuracy of the print medium 2 directed upstream in the transportation direction. That is, the transportation accuracy in the feed direction PF is higher than the transportation accuracy in the back feed direction BF. That is, during normal printing, an image is printed onto the print medium 2 while the transportation mechanism 60 transports the print medium 2 in the feed direction PF, namely, downstream, with high transportation accuracy. This is because the accuracy of transportation control of the print medium 2 directly relates to the print quality. That is, when the transportation accuracy in the feed direction PF is low, print length variations occur, which result in a printed image as an extension image due to a transportation shift. For this reason, the transportation accuracy of the transportation mechanism 60 is high in the feed direction PF. In contrast, the print medium 2 which has once been transported is difficulty transported in the back feed direction BF with high accuracy, and thus, the accuracy for transportation in the back feed direction BF has no significant meaning. That is, transportation in the back feed direction BF is performed when the print medium 2 is loaded and leveled, when crumples formed due to cockling is flattened, or when the print medium 2 is returned to a heater section for drying, and the transportation in the back feed direction BF does not require high accuracy. Thus, the transportation accuracy of the transportation mechanism 60 in the back feed direction BF is low. As illustrated in FIG. 3, the camera 40 is disposed at a location shifted in the feed direction PF, namely, a downstream direction in the transportation direction, from the location of the print head 22. Thus, also when no error occurs in the attachment location of the camera 40, the location of the location adjusting pattern PPS in the captured image by the camera 40 is shifted in the back feed direction BF, namely, an upstream direction in the transportation direction, to a location direction. At this time, the camera 40 is disposed at a location shifted in the feed direction PF from the print head 22 by a shift amount larger than a value obtained by adding together all attachment tolerances of the camera 40. In this way, also when the attachment location of the camera 40 is shifted in the back feed direction BF at a maximum, transportation in the feed direction PF in which the transportation accuracy is high enables the location of the capture area AR to be adjusted. Thus, the location adjustment of the capture area AR is realizable with high accuracy, and it is possible to improve the accuracy of the location adjustment of the capture area AR.

2. Details of Process

Next, details of a process in the present embodiment will be described. The present embodiment provides an adjustment method of a capturing location of the camera 40 configured to capture a print adjusting pattern for ejection adjustment and the like of ink. That is, adjustment is made possible such that the capturing location after attachment of the camera 40 falls within a range of accuracy required for the print adjustment. For example, in order to adjust a relative position between the print head 22 and the camera 40, the location adjusting pattern PPS shown in FIG. 3 is printed onto the print medium 2. The location adjusting pattern PPS is printed in only one color by the reference head chip. In FIG. 3, the head chip 23 of black serving as the reference head chip prints the location adjusting pattern PPS. A difference value between the location adjusting pattern PPS printed and the location of the capturing center serving as an ideal capturing location is computed. The difference value in the main scan direction DR1 is stored as a control correction value of the CR motor configured to move the carriage 20, and the CR motor performs movement control such that the ideal capturing location is achieved when the print adjusting pattern is captured. That is, movement control of the movement mechanism 50 is performed based on the correction value Δx. The difference value in the sub-scan direction DR2 is stored as the movement correction value of the print medium 2, and transportation control of the print medium 2 is performed such that the ideal capturing location is achieved when the print adjusting pattern is captured. That is, transportation control of the movement mechanism 60 is performed based on the correction value Δy. The correlation with the head chips other than the reference head chip is adjusted by a head alignment function among the head chips.

The camera 40 is disposed at a location shifted downstream in the transportation direction to a location such that a transportation correction value of the print medium 2 in the sub-scan direction DR2 is necessarily a positive correction value with respect to the transportation of the print medium 2. The numerical value of the shift amount is determined in consideration of an assembly tolerance of the camera 40 and an attachment tolerance of the camera 40 and the reference head chip to the carriage 20. The correction value Δx serving as the movement correction value and the correction value Δy serving as the transportation correction values are measured again when the print head 22 is replaced and in an elapsed time in which a mechanical displacement of the print head 22 and/or the camera 40 occurs, and thereby, a continuous effect can be expected.

Figure 5:
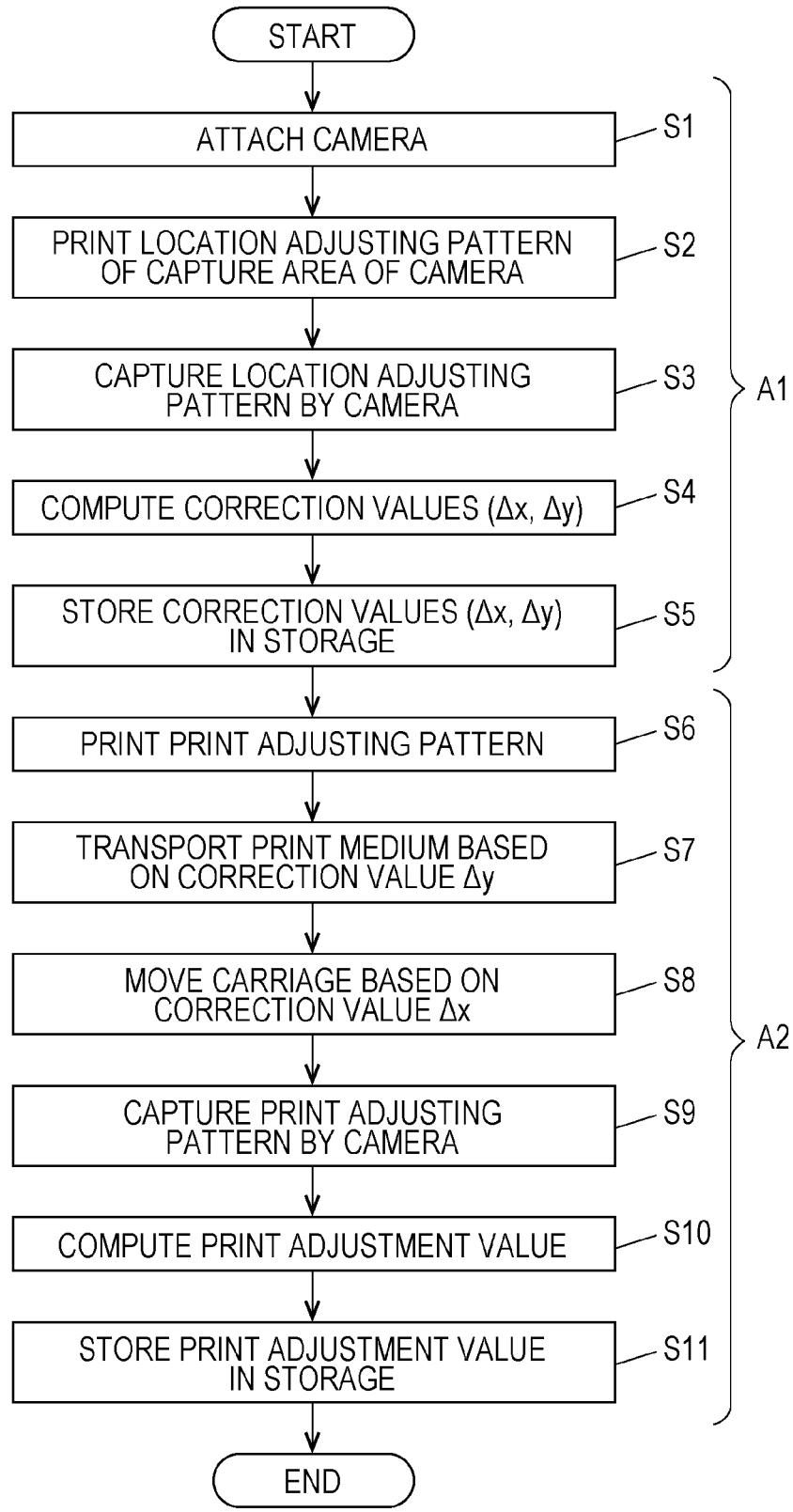
FIG. 5 is a flowchart illustrating a process example of the present embodiment.

FIG. 5 is a flowchart illustrating a detailed process example of the present embodiment. In FIG. 5, A1 denotes a flow of processes in which the camera 40 is attached to the carriage 20, and a correction value of the attachment location of the camera 40 is computed and stored.

First, the camera 40 for automatic adjustment is attached to the carriage 20 (step S1). Attachment of the camera 40 is performed by a worker or a work robot, for example, when the printer 10 is assembled or the print head 22 is replaced. As illustrated in FIG. 3, the attachment location of the camera 40 is a location shifted downstream in the transportation direction of the print medium 2 from the print head 22 in the carriage 20. Then, the camera 40 is attached to the carriage 20 such that the correction value Δy serving as the transportation correction value of the print medium 2 is a positive correction value with respect to the transportation of the print medium 2.

Next, the printer 10 prints a location adjusting pattern of the capture area of the camera 40 (step S2). For example, the printer 10 moves the carriage 20 to a prescribed location to be a print location of the location adjusting pattern and prints the location adjusting pattern serving as the attachment location pattern by using the reference head chip. The location adjusting pattern is printed by, for example, the head chip 23 of black serving as the reference head chip. The correlation to the other head chips is adjusted by the head alignment function.

Then, the location adjusting pattern is captured by the camera 40 (step S3). That is, the printer 10 moves the carriage 20 to the location of the location adjusting pattern thus printed and captures the location adjusting pattern in a capturing location by the camera 40. The printer 10 computes the correction values (Δx and Δy) of the capturing location of the camera 40 from information of the location adjusting pattern captured by the camera 40 (step S4). For example, in FIG. 4, the printer 10 computes, as the correction value Δx, a difference between the center X-coordinate of the location adjusting pattern PPS thus captured and the center X-coordinate of the capture area AR. The printer 10 further computes, as the correction value Δy, a difference between the center Y-coordinate of the location adjusting pattern PPS thus captured and the center Y-coordinate of the capture area AR. The X-axis direction is the main scan direction DR1 serving as the movement direction of the carriage 20, and the Y-axis direction is the sub-scan direction DR2 serving as the transportation direction of the print medium 2. The printer 10 stores the correction values (Δx and Δy) thus computed in the storage 80 (step S5).

In FIG. 5, A2 denotes a flow of processes in which the accuracy of the print adjustment is corrected based on the correction values thus obtained for the location adjustment.

First, the printer 10 prints a print adjusting pattern (step S6). For example, the printer 10 moves the carriage 20 to a prescribed position and prints the print adjusting pattern by all the head chip 23 to 28 of FIG. 3.

Then, the printer 10 controls transportation of the print medium 2 based on the correction value Δy (step S7). For example, the printer 10 reads the correction value Δy which is stored as a shift correction value of the center location of the capture area in the storage 80 and which is a difference between the center Y-coordinates. The printer 10 controls transportation movement of the print medium 2 by Δy. Moreover, the printer 10 controls movement of the carriage 20 based on the correction value Δx (step S8). For example, the printer 10 reads the correction value Δx which is stored as a shift correction value of the center location of the capture area in the storage 80 and which is a difference between the center X-coordinates. Then, the printer 10 controls movement of the carriage 20 by Δx when the camera 40 captures the print adjusting pattern.

Next, the printer 10 captures the print adjusting pattern by the camera 40 (step S9). That is, after correction control of the transportation and the movement is performed in steps S7 and S8, the print adjusting pattern is captured by the camera 40. Then, the printer 10 computes a print adjustment value (step S10). When the print adjustment value is an adjustment value of an ejection timing of ink, deviations of ejection timings of ink of the nozzles of the reference head chips disposed in the carriage 20 are computed, and a deviation of an ejection timing between the reference head chip and each of the other head chips is computed. Then, the printer 10 stores the print adjustment value thus computed in the storage 80 (step S11). When printing is actually performed onto the print medium 2, the print adjustment value is used to realize satisfactory print control.

As described above, in a correction value generation method of the present embodiment, the printer 10 prints the location adjusting pattern of the capture area of the camera 40 onto the print medium 2 by the print head 22. That is, the printing in step S2 of FIG. 5 is performed. After the printer 10 prints the location adjusting pattern, the printer 10 moves the carriage 20 by the movement mechanism 50 to the location of the location adjusting pattern and captures the location adjusting pattern by the camera 40 attached to the carriage 20. That is, the capturing in step S3 is performed. Then, the printer 10 generates, based on the captured image of the location adjusting pattern captured by the camera 40, the correction value Δx for correcting the movement amount of the movement mechanism 50 and the correction value Δy for correcting the transportation amount of the transportation mechanism 60 as the correction values for the location adjustment of the capture area of the camera 40. That is, the computing in step S4 is performed. This enables the correction values Δx and Δy for correcting the location of the capture area of the camera 40 to an appropriate location to be generated from the captured image of the location adjusting pattern. Using the correction values Δx and Δy thus generated enables the capture area of the camera 40 for the print adjustment to be appropriately adjusted. Therefore, also when the error occurs in the attachment location of the camera 40, capturing an image by the camera 40 in an optimal angle of view becomes possible, and an appropriate print adjustment based on the captured image by camera 40 becomes possible. For example, the center location of the angle of view when the camera 40 is attached is made adjustable, and it is possible to capture the print adjusting pattern required for the print adjustment at an optimal angle of view. Moreover, it is possible to secure an efficient angle of view of the camera 40, and it becomes possible to, for example, reduce the print adjustment time, reduce the load of the print adjustment process, and use a large pattern as the print adjusting pattern required for the print adjustment.

FIG. 6 is a view illustrating an example of the print adjusting pattern PT1 used to adjust the ejection timing of ink. The print adjusting pattern PT1 includes a ruled line pattern KP1 in which ruled lines L1 to L13 are aligned at prescribed intervals and a ruled line pattern KP2 in which ruled line L14 to L26 are aligned at prescribed intervals. The ruled line pattern KP2 is a pattern image in which the ruled lines L14 to L26 are shifted by a prescribed amount respectively from the ruled lines L1 to L13 included in the ruled line pattern KP1 and are aligned. The printer 10 captures the print adjusting pattern PT1 by the camera 40, and based on the captured image thus obtained, the printer 10 performs the print adjustment of adjusting the ejection timing of ink from the print head 22. For example, the printer 10 analyzes the captured image of the print adjusting pattern PT1 to obtain the adjustment value of the ejection timing.

Figure 7:
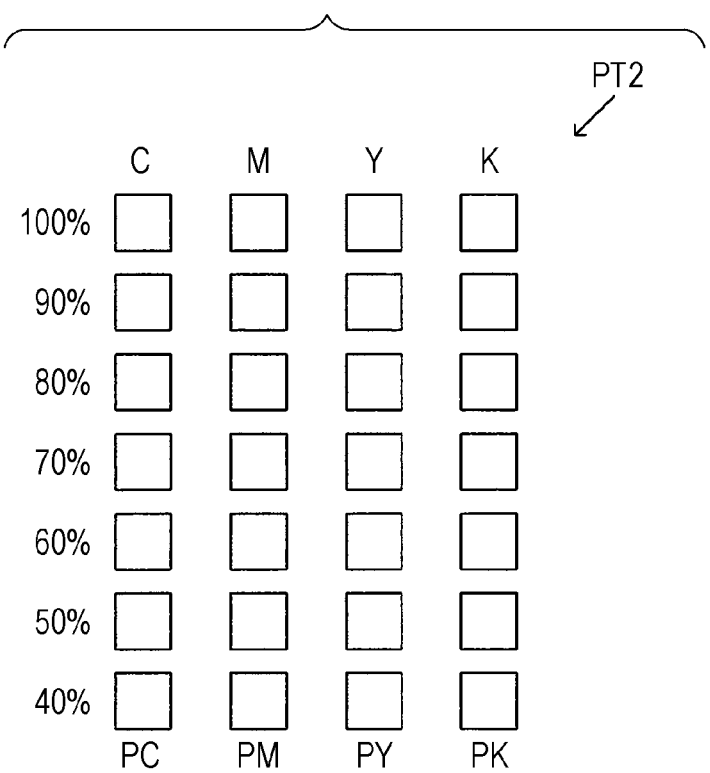
FIG. 7 is a view illustrating an example of a print adjusting pattern used to adjust an ejection amount.
Figure 8:
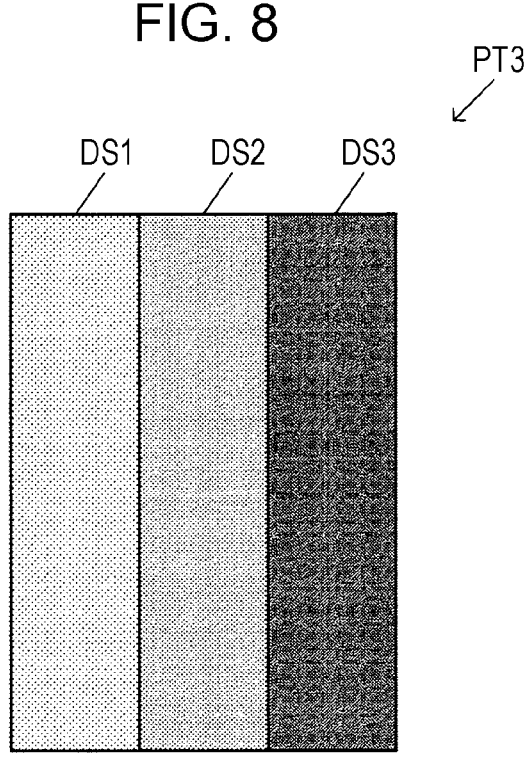
FIG. 8 is a view illustrating an example of a print adjusting pattern used to adjust uneven print.
Figure 9:
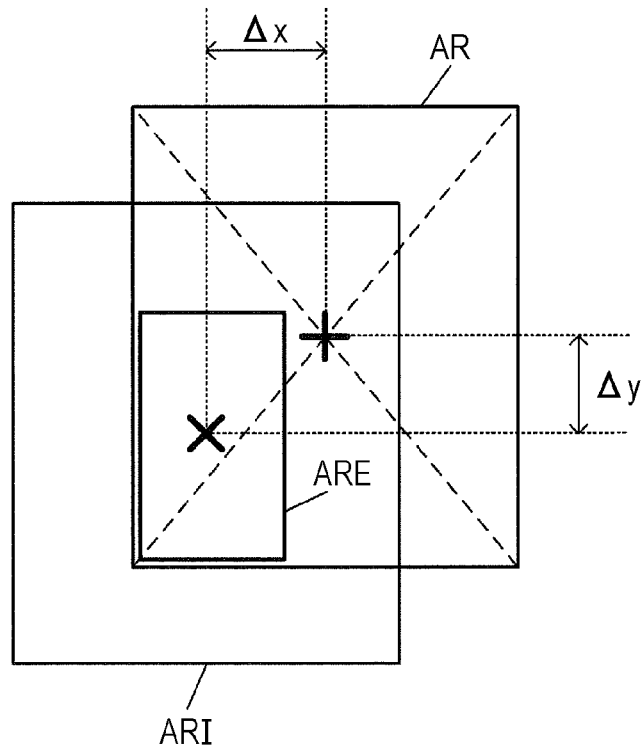
FIG. 9 is a view illustrating a reduction of an effective capture range due to an error in an attachment location of the camera.
Figure 10:
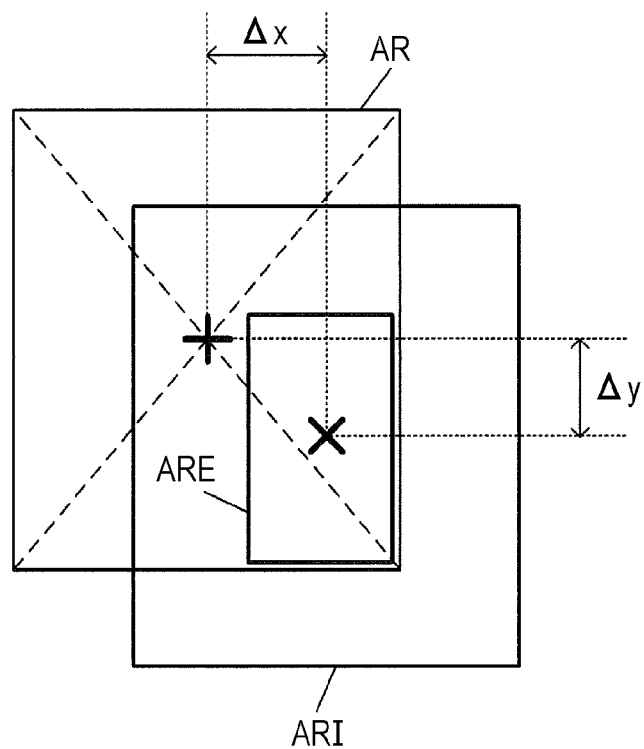
FIG. 10 is a view illustrating a reduction of an effective capture range due to an error in an attachment location of the camera.
Figure 11:
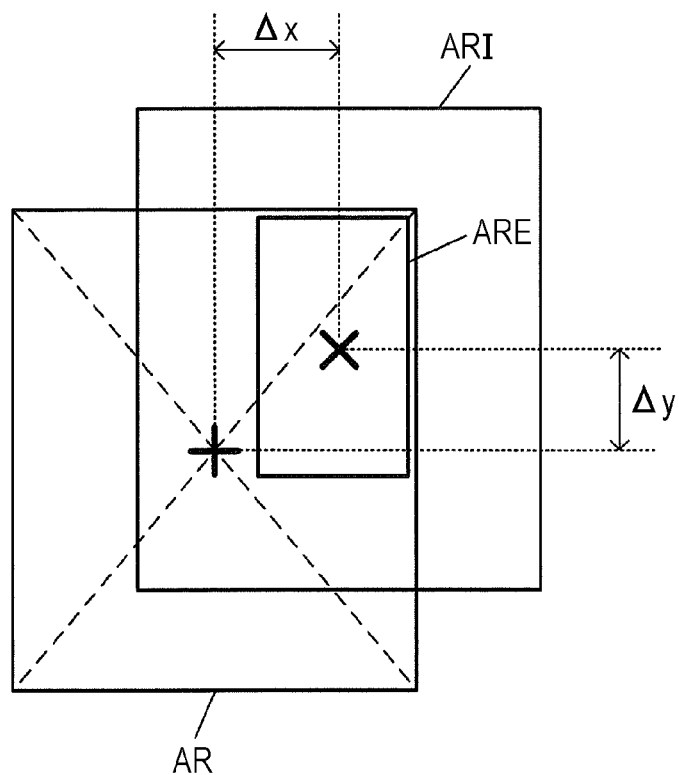
FIG. 11 is a view illustrating a reduction of an effective capture range due to an error in an attachment location of the camera.
Figure 12:
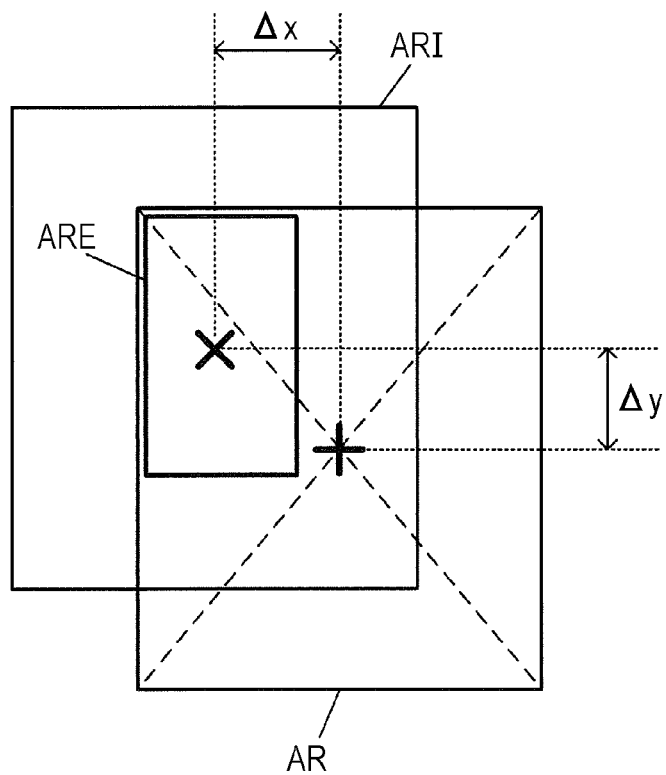
FIG. 12 is a view illustrating a reduction of an effective capture range due to an error in an attachment location of the camera.

FIG. 7 shows an example of a print adjusting pattern PT2 used to adjust an ejection amount of ink. Here, a case where the colors of inks ejected from the print head 22 are cyan, magenta, yellow, and black will be described as an example. In the print adjusting pattern PT2 in FIG. 7, a detection pattern PC for cyan, a detection pattern PM for magenta, a detection pattern PY for yellow, and a detection pattern PK for black are disposed in alignment with each other. Each of the detection patterns PC, PM, PY, and PK includes seven detection charts having different concentrations set with concentration 10% intervals from concentration 100% to concentration 40%. The concentration indicates the occupancy of ink per prescribed unit area. The printer 10 captures the print adjusting pattern PT2 by the camera 40, and based on the captured image thus obtained, the printer 10 performs the print adjustment of adjusting the ejection amount of ink from the print head 22. For example, the printer 10 analyzes the captured image of the print adjusting pattern PT2 to obtain the adjustment value of the ejection amount.

FIG. 8 is a view illustrating an example of a print adjusting pattern PT3 used to adjust uneven print. The print adjusting pattern PT3 in FIG. 8 includes band-like detection charts DS1, DS2, and DS3 whose longitudinal directions correspond to the transportation direction. The print adjusting pattern PT3 is a pattern image in which the concentration in each of the detection charts DS1 to DS3 is the same and the concentrations of adjacent detection charts are different. Each detection chart is formed for a corresponding one of the inks of colors. The printer 10 captures the print adjusting pattern PT3 by the camera 40, and based on the captured image thus obtained, the printer 10 performs the print adjustment of adjusting uneven print. For example, the printer 10 analyzes the captured image of the print adjusting pattern PT3 to obtain the adjustment value of the uneven print. Note that the print adjusting pattern is not limited to the examples illustrated in FIG. 6 to FIG. 8 but may be various types of pattern images such as a print adjusting pattern for adjustment of the transportation amount.

FIGS. 9, 10, 11, and 12 are views illustrating a reduction of the effective capture range ARE due to the error of the attachment location of the camera 40. As illustrated in FIG. 9 to FIG. 12, when an error occurs in the attachment location of the camera 40, the capture area AR of the camera 40 in practice is shifted in various directions with respect to the ideal capture area ARI. Thus, when the location adjustment of the capture area AR is not performed, the error in the attachment location of the camera 40 reduces the effective capture range ARE of the camera 40, thereby reducing a substantial angle of view of the camera 40. When the effective capture range ARE is reduced, the number of images to be captured increases also when a print adjusting pattern of the same size is captured.

In FIGS. 13 and 14, the print head 22 including a plurality of head chips HD1, HD2, HD3, and HD4 prints the print adjusting pattern PT1 for adjustment of the ejection timing described in FIG. 6 onto the print medium 2. FIG. 13 shows an example in which the location adjustment of the capture area is not performed. In this case, the effective capture range is reduced as illustrated in FIGS. 9 to 12. Therefore, in order to capture the entirety of the print adjusting pattern PT1, for example, 60 captured images J1 to J60 are required. Thus, when the number of captured images increases, for example, a time of the print adjustment process increases, and the number of captured images to be analyzed increases, and therefore, the load of the print adjustment processes increases.

In contrast, FIG. 14 shows an example in which the location adjustment of the capture area is performed, and the effective capture range is suppressed from being reduced. Therefore, in order to capture the entirety of the print adjusting pattern PT1, for example, 16 captured images I1 to I16 suffice, and therefore, it is possible to reduce the number of captured images as compared to the example in FIG. 13. Thus, reducing the number of captured images enables the time of the print adjustment process to be reduced, and reducing the number of captured images to be analyzed enables the load of the print adjustment process to be reduced.

As described above, the printer of the present embodiment includes a carriage configured to move with a print head mounted thereon, the print head being configured to eject ink, a camera attached to the carriage and configured to capture an image printed on a print medium by the print head, a movement mechanism configured to move the carriage along a main scan direction, a transportation mechanism configured to transport the print medium along a sub-scan direction, a processor configured to control printing of the image onto the print medium, and a storage. The storage is configured to store a correction value of a movement amount of the movement mechanism as a first correction value for a location adjustment of a capture area of the camera and store a correction value of a transportation amount of the transportation mechanism as a second correction value for the location adjustment of the capture area.

According to the present embodiment, the carriage on which the print head is mounted is moved along the main scan direction by the movement mechanism, and the print medium is transported along the sub-scan direction by the transportation mechanism, thereby printing an image onto the print medium. On the carriage, a camera is mounted, and the camera is configured to capture an image printed by the print head. The storage is configured to store a correction value of a movement amount of the movement mechanism as the first correction value for the location adjustment of the capture area of the camera and store a correction value of a transportation amount of the transportation mechanism as the second correction value for the location adjustment of the capture area. Thus, the movement amount of the movement mechanism is controlled based on the first correction value stored in the storage, and the transportation amount of the transportation mechanism is controlled based on the second correction value stored in the storage, and thereby, it becomes possible to perform the location adjustment of the capture area of the camera. As a result, it is possible to provide a printer configured to perform an appropriate location adjustment of the capture area of the camera configured to capture a print image.

Moreover, in the present embodiment, when the processor performs the print adjustment based on a captured image by the camera, the processor may control the movement amount of the movement mechanism based on the first correction value and may control the transportation amount of the transportation mechanism based on the second correction value.

In this way, also when an error occurs in the attachment location of the camera, the error is compensated based on the first correction value and the second correction value, and an appropriate print adjustment is realizable.

Moreover, in the present embodiment, the processor may control printing of a print adjusting pattern onto the print medium, and the processor may control, after the printing of the print adjusting pattern, the movement amount based on the first correction value and control the transportation amount based on the second correction value to perform the location adjustment of the capture area of the camera. The camera may capture the print adjusting pattern after the location adjustment of the capture area.

Thus, after the image of the print adjusting pattern is printed on the print medium, the location adjustment of the capture area of the camera is performed based on the first correction value and the second correction value, and after the location adjustment of the capture area, it is possible to capture the print adjusting pattern by the camera. Thus, it is possible to realize a print adjustment based on a captured image captured at an appropriate angle of view.

Moreover, in the present embodiment, the processor may control printing of the location adjusting pattern of the capture area of the camera onto the print medium and may move, after the location adjusting pattern is printed, the carriage to a location of the location adjusting pattern. The camera may capture the location adjusting pattern, and the processor may obtain the first correction value and the second correction value based on a captured image of the location adjusting pattern captured by the camera and may store the first correction value and the second correction value in the storage.

In this way, a shift amount of the location of the location adjusting pattern in the captured image by the camera is analyzed to obtain the first correction value and the second correction value, which are then stored in the storage. Then, when the print adjustment based on the captured image by the camera is performed, control of the movement amount of the movement mechanism and control of the transportation amount of the transportation mechanism are performed respectively based on the first correction value and the second correction value stored in the storage, and thereby, it is possible to realize the print adjustment based on the captured image imaged at the optimal angle of view.

Moreover, in the present embodiment, the processor may obtain, as the first correction value, a shift amount of the location of the location adjusting pattern in the main scan direction with respect to a reference location of the capture area, and may obtain, as the second correction value, a shift amount of the location of the location adjusting pattern in the sub-scan direction with respect to the reference location.

In this way, analyzing the shift amount of the location in the location adjusting pattern enables the first correction value and the second correction value to be obtained.

Moreover, in the present embodiment, the processor may cause a reference head chip included in the plurality of head chips included in the print head to eject ink to control printing of the location adjusting pattern onto the print medium.

This enables the location adjusting pattern, which is to be printed with ink from the reference head chip, is printed onto the print medium and enables the first correction value and the second correction value to be computed based on the location adjusting pattern thus printed.

Moreover, in the present embodiment, the camera may be disposed at a location shifted downstream in the transportation direction of the transportation mechanism from the print head.

In this way, also when no error occurs in the attachment location of the camera, the location of the location adjusting pattern in the captured image by the camera is shifted to an upstream location in the transportation direction to a location. The transportation mechanism transports the print medium downstream in the transportation direction, and thereby, the location adjustment of the capture area of the camera during the print adjustment becomes possible, and it is possible to realize an appropriate location adjustment.

Moreover, in the present embodiment, in the transportation mechanism, a transportation accuracy of the print medium may be higher downstream than upstream in the transportation direction.

Thus, transportation upstream in the transportation direction in which the transportation accuracy is high enables the location adjustment of the capture area to be realized, and therefore, it is possible to realize the location adjustment of the capture area of the camera with high accuracy.

The present embodiment is a generation method of correction values of a printer including a carriage configured to move with a print head mounted thereon, the print head being configured to eject ink, a camera attached to the carriage and configured to capture an image printed on a print medium by the print head, a movement mechanism configured to move the carriage in a main scan direction, and a transportation mechanism configured to transport the print medium along a sub-scan direction. The generation method of the present embodiment includes printing a location adjusting pattern of a capture area of the camera onto the print medium by the print head, moving the carriage by the movement mechanism to a location of the location adjusting pattern after the printing of the location adjusting pattern, and capturing the location adjusting pattern by the camera attached to the carriage. The generation method includes generating, as location adjusting correction values of the capture area of the camera, a first correction value for correcting a movement amount of the movement mechanism and a second correction value for correcting a transportation amount of the transportation mechanism based on a captured image of the location adjusting pattern captured by the camera.

In this way, it is possible to generate, from the captured image of the location adjusting pattern, the first correction value and the second correction value for correcting the location of the capture area of the camera to an appropriate location. Using the first correction value and the second correction value thus generated enables the capture area of the camera for the print adjustment to be appropriately adjusted, and an appropriate print adjustment based on the captured image by the camera becomes possible.

The embodiment and its variations to which the present disclosure is applied have been described above. However, the present disclosure is not limited to the embodiment and its variation as is. In an implementation phase, components may be embodied in a modified manner within a range not departing from the gist of the disclosure. Moreover, components disclosed in the above embodiments and variation may be combined as appropriate in various different forms, and thereby, it is possible to provide various types of disclosure. For example, some of all the components in the embodiment and variations may be omitted. Moreover, components described in different embodiment and variations may be accordingly combined. Moreover, terms described at least once together with different terms in a broad sense or the same sense in the specification and drawings may be replaced with the different terms in any part in the specification and drawings. Thus, various modifications and applications may be made without departing from the gist of the disclosure.

What is claimed is:

1. A printer, comprising:
a carriage configured to move with a print head mounted thereon, the print head being configured to eject ink,
a camera attached to the carriage and configured to capture an image printed on a print medium by the print head,
a movement mechanism configured to move the carriage along a main scan direction,
a transportation mechanism configured to transport the print medium along a sub-scan direction,
a processor configured to control printing of the image onto the print medium, and
a storage configured to store a correction value of a movement amount of the movement mechanism as a first correction value for a location adjustment of a capture area of the camera and store a correction value of a transportation amount of the transportation mechanism as a second correction value for the location adjustment of the capture area.

2. The printer according to claim 1, wherein
when the processor performs the print adjustment based on a captured image by the camera, the processor controls the movement amount of the movement mechanism based on the first correction value and controls the transportation amount of the transportation mechanism based on the second correction value.

3. The printer according to claim 1, wherein
the processor controls printing of a print adjusting pattern onto the print medium and controls, after the printing of the print adjusting pattern, the movement amount based on the first correction value and controls the transportation amount based on the second correction value to perform the location adjustment of the capture area of the camera, and
the camera captures the print adjusting pattern after the location adjustment of the capture area.

4. The printer according to claim 1, wherein
the processor controls printing of the location adjusting pattern of the capture area of the camera onto the print medium, and moves, after the location adjusting pattern is printed, the carriage to a location of the location adjusting pattern,
the camera captures the location adjusting pattern, and
the processor obtains the first correction value and the second correction value based on a captured image of the location adjusting pattern captured by the camera and stores the first correction value and the second correction value in the storage.

5. The printer according to claim 4, wherein
the processor
obtains, as the first correction value, a shift amount of the location of the location adjusting pattern in the main scan direction with respect to a reference location of the capture area, and obtains, as the second correction value, a shift amount of the location of the location adjusting pattern in the sub-scan direction with respect to the reference location.

6. The printer according to claim 4, wherein the processor causes a reference head chip included in the plurality of head chips included in the print head to eject ink to control printing of the location adjusting pattern onto the print medium.

7. The printer according to claim 1, wherein the camera is disposed at a location shifted downstream in the transportation direction of the transportation mechanism from the print head.

8. The printer according to claim 7, wherein in the transportation mechanism, a transportation accuracy of the print medium is higher downstream than upstream in the transportation direction.

9. A generation method of correction values of a printer including a carriage configured to move with a print head mounted thereon, the print head being configured to eject ink, a camera attached to the carriage and configured to capture an image printed on a print medium by the print head, a movement mechanism configured to move the carriage in a main scan direction, and a transportation mechanism configured to transport the print medium along a sub-scan direction, the generation method comprising:

printing a location adjusting pattern of a capture area of the camera onto the print medium by the print head;

moving the carriage by the movement mechanism to a location of the location adjusting pattern after the printing of the location adjusting pattern;

capturing the location adjusting pattern by the camera attached to the carriage; and generating, as location adjusting correction values of the capture area of the camera, a first correction value for correcting a movement amount of the movement mechanism and a second correction value for correcting a transportation amount of the transportation mechanism based on a captured image of the location adjusting pattern captured by the camera.

* * * * *